US006297963B1

(12) United States Patent
Fogle

(10) Patent No.: US 6,297,963 B1
(45) Date of Patent: Oct. 2, 2001

(54) SECURITY DOCKING CABLE FOR COMPUTER DOCKING SYSTEM

(75) Inventor: Steven L Fogle, Corvallis, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/394,981

(22) Filed: Sep. 13, 1999

(51) Int. Cl.[7] ............... H05K 7/00; E05B 69/00
(52) U.S. Cl. ............ 361/747; 361/683; 361/686; 361/732; 70/58
(58) Field of Search .................. 361/679–686, 361/728, 729, 730, 732, 725, 740, 747, 731; 70/33, 58, 57, 38 R; 439/638, 928

(56) References Cited

U.S. PATENT DOCUMENTS

| 4,311,883 | * | 1/1982 | Kidney ..................... 179/189 R |
| 4,570,465 | * | 2/1986 | Bennett ........................... 70/18 |
| 4,663,611 | * | 5/1987 | Humphrey ..................... 340/582 |
| 4,975,550 | * | 12/1990 | Panchisin ..................... 200/43.08 |
| 5,135,197 | * | 8/1992 | Kelley et al. .................. 248/551 |
| 5,190,465 | * | 3/1993 | Davidge et al. ................ 439/304 |
| 5,212,348 | * | 5/1993 | Gibson ........................ 174/74 R |
| 5,228,319 | * | 7/1993 | Holley et al. . |
| 5,461,546 | * | 10/1995 | Kobayashi et al. .............. 361/796 |
| 5,502,989 | * | 4/1996 | Murray, Jr. et al. ............... 70/58 |
| 5,540,597 | * | 7/1996 | Budman et al. ................. 439/77 |
| 5,568,359 | * | 10/1996 | Cavello et al. ................ 361/686 |
| 5,579,657 | * | 12/1996 | Makous ........................ 70/15 |
| 5,692,400 | | 12/1997 | Bliven et al. ................... 70/58 |
| 5,709,110 | * | 1/1998 | Greenfield et al. ............... 70/58 |
| 5,754,108 | * | 5/1998 | Ungarsohn ..................... 340/568 |
| 5,764,835 | * | 6/1998 | Rubin et al. ................... 385/104 |
| 5,784,253 | * | 7/1998 | Ooka et al. .................... 361/686 |
| 5,805,412 | * | 9/1998 | Yanagisawa et al. ............. 361/686 |
| 5,805,474 | * | 9/1998 | Danielson et al. .............. 364/708.1 |
| 5,812,356 | * | 9/1998 | O'Connor ..................... 361/179 |
| 5,925,128 | * | 7/1999 | Harmon ....................... 713/200 |
| 5,941,963 | * | 8/1999 | Charles et al. ................. 710/62 |
| 5,995,366 | * | 11/1999 | Howell et al. .................. 361/686 |
| 6,007,361 | * | 12/1999 | Flachslaender ................. 439/358 |
| 6,012,941 | * | 1/2000 | Burdenko et al. ............... 439/373 |
| 6,044,215 | * | 3/2000 | Charles et al. ................. 395/500.46 |
| 6,088,229 | * | 7/2000 | Seto et al. ..................... 361/726 |

FOREIGN PATENT DOCUMENTS 57-191604 * 11/1982 (JP) ........................ 65/431

* cited by examiner

Primary Examiner—Leo P. Picard
Assistant Examiner—Anatoly Vortman

(57) ABSTRACT

A docking cable, used to interconnect a computer with a clocking station, has an integrated cabling structure that bundles at least one electrically conductive line (e.g., signal, ground, or power line) together with a security cable. The security cable may be implemented as a strand or alternatively as a grounded tube that wraps around the conductive line to provide both structural security as well as a shield to protect from external electro-magnetic interference. The integrated cabling structure preferably has an anchor portion that allows affixation of the docking cable to a fixture (e.g., desktop, chair, wall, etc.). The docking cable preferably has a computer-side connector coupled to one end of the integrated cabling structure for connection to the computer and a station-side connector coupled to the other end of the integrated cabling structure to interface with the docking station. The computer-side connector preferably has a locking mechanism for locking onto the computer. It also preferably has an undocking button to enable a user to request that the computer be undocked from the docking station and preferably an indicator light to indicate when it is safe to undock the computer from the docking station.

19 Claims, 3 Drawing Sheets

SECURITY DOCKING CABLE FOR COMPUTER DOCKING SYSTEM

TECHNICAL FIELD

This invention relates to computer docking stations. More particularly, this invention relates to mechanisms for locking and preventing theft of portable computers interfaced with docking stations.

BACKGROUND

Portable computers are widely used and a popular alternative to desktop computers. The ability to carry a powerful computing device that offers a full range of processing and communication functionality is very appealing to our mobile generation.

A docking station is a stationary unit that adapts a portable computer for use as a stationary desktop computer. A conventional docking station physically interconnects with the portable computer and provides electronics to interface the portable computer with a set of peripherals, such as a large CRT monitor (e.g., VGA), a normal size or ergonomic keyboard, a mouse, printer, CD-ROM drive, network, and so forth. The docking station resides on the user's desk.

When working at the desk, the user docks the portable computer at the docking station by coupling the computer to the station or by physically loading the computer onto a docking tray. Once mated, the portable computer is electronically interfaced with the docking station to control the peripherals. In this manner, the portable computer operates as the central processing unit (CPU), with the docking station providing support capabilities for the peripherals. When the user leaves the desk, he/she simply undocks the portable computer from the docking station and carries it along for portable use.

Docking stations range in their sophistication and available extensions to the portable computer. A scaled-down docking station, which is commonly referred to as a "port replicator", merely extends a set of peripheral ports for the docked portable computer. Power might also be directed through a port replicator so that the portable computer need not be manually plugged in before desktop use.

A slightly more sophisticated docking station, which is often referred to as an "enhanced port replicator", offers a similar set of peripherals and additional features, such as an external bus system. An external bus system allows use of expansion cards in conjunction with the portable computer.

More sophisticated stations, often called "full" docking stations or simply "docking stations", offer integrated computer peripherals in addition to peripheral ports and bus systems. For instance, a docking station might include sound peripherals such as speakers, hard disk drives, CD ROM drives, DVD drives, and tape backup systems.

While portability and compact size are appealing qualities in portable computers and docking stations, these very same attributes pose a significant risk of theft. Portable computers and docking stations are easy to steal. While walking off with a desktop PC might garner some questioning looks in the workplace, carrying around a portable computer or docking station may go unnoticed due to the inherent size attributes of these devices.

Locks are available to address this problem. One type of lock is a device consisting of a cable or tether that can be secured at one end to a desk or fixture, and at the other end to a computer. Many portable computers and docking stations are equipped with receptacles for mating with such locks.

One particular design is described in commonly-assigned U.S. Pat. No. 5,692,400, entitled "Securing Portable Computers and Associated Docking Systems". This patent describes a single tethered locking device that secures both a portable computer and its associated docking station. An opening is formed in the docking station. The opening is sized and positioned so that a Kensington lock can be passed through the opening and locked into a receptacle on the portable computer. In one implementation, placing the Kensington lock through the opening interferes with a computer ejection mechanism in the docking system, and thus prevents a user from attempting to eject the docked computer. In another implementation, attaching the Kensington lock causes a lock extension to engage the receptacle on the portable computer. In either implementation, a single attachment of a Kensington lock secures both the portable computer and its docking station to a desk or other fixture.

SUMMARY

A docking cable, used to interconnect a computer with a docking station, has an integrated cabling structure that bundles at least one electrically conductive line (e.g., signal, ground, or power line) together with a security cable. The security cable may be implemented as a strand or alternatively as a grounded tube that wraps around the conductive line to provide both structural security as well as a shield to protect from external electro-magnetic interference. The integrated cabling structure preferably has an anchor portion that allows affixation of the docking cable to a fixture (e.g., desktop, chair, wall, etc.). The docking cable preferably has a computer-side connector coupled to one end of the integrated cabling structure for connection to the computer and a station-side connector coupled to the other end of the integrated cabling structure to interface with the docking station. The computer-side connector preferably has a locking mechanism for locking onto the computer. It also preferably has an undocking button to enable a user to request that the computer be undocked from the docking station and preferably an indicator light to indicate when it is safe to undock the computer from the docking station.

DETAILED DESCRIPTION

Figure 1:
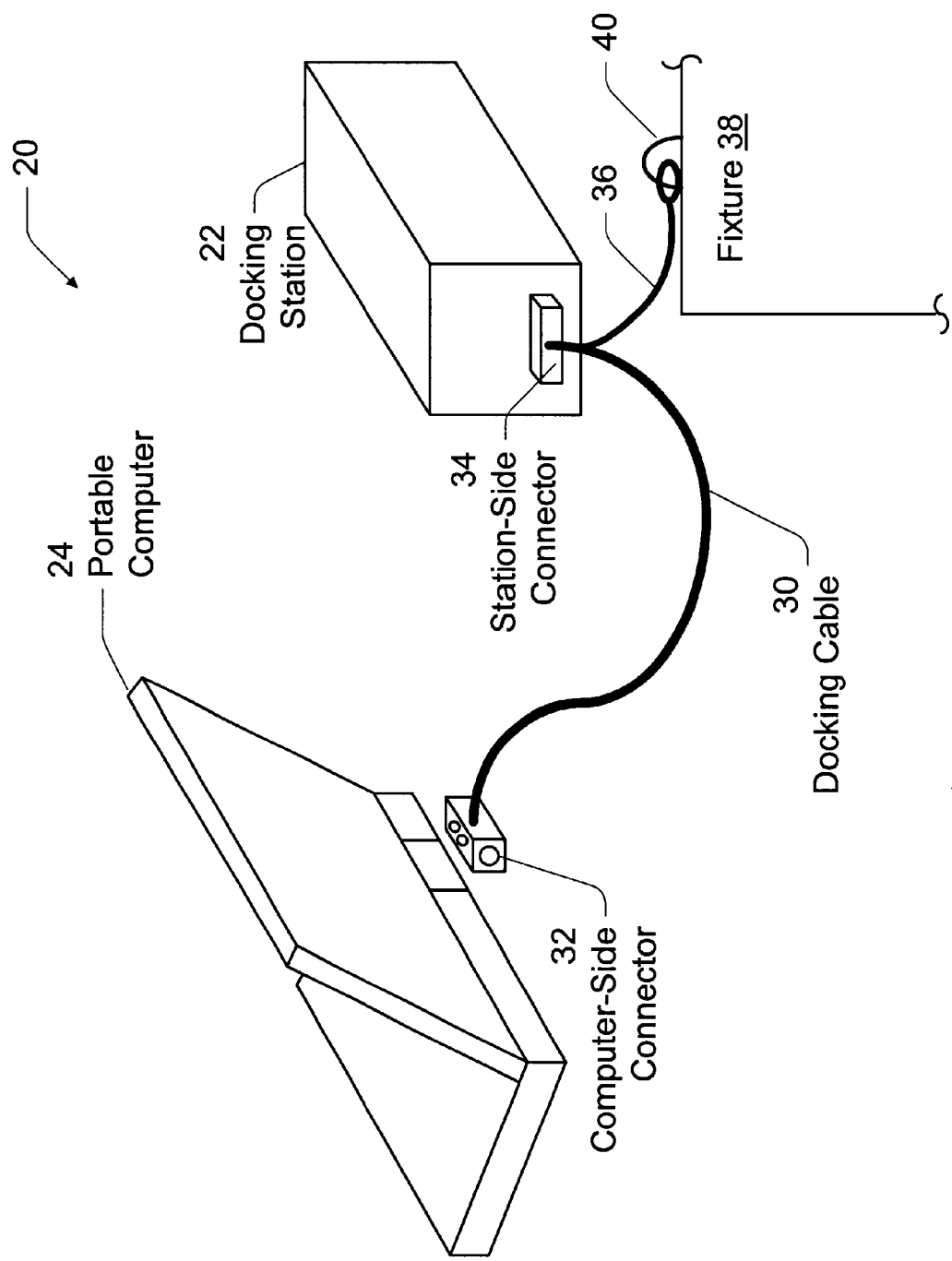
FIG. 1 is a perspective view of a computer system having a portable computer and a docking station.

FIG. 1 shows a computer system 20 having a docking station 22 and a portable computer 24. The docking station 22 is illustrated as a detached docking station and the portable computer 24 is illustrated as a laptop computer.

The docking station and portable computer can be implemented as other types of computing devices. For instance, the portable computer may be implemented as a notebook computer, sub-notebook computer, a handheld computer, or other types of portable computing devices the docking station may be implemented as a full station, or as a port replicator, or as a cradle used for small handheld computers.

As used herein, the term "docking station" is intended to broadly apply to various forms of bases ranging from a sophisticated, full docking station having internal processing and electronic components, cable interconnects, and a power supply unit, to an unsophisticated port replicator that simply provides a means to manage cable connections.

A docking cable 30 interconnects the portable computer 24 with the docking station 22 when the computer is docked. The portable computer 24 is "docked" with the docking station 22 when the flexible docking cable 30 is connected to both devices. Alternatively, the portable computer 24 is "undocked" from the docking station 22 when the docking cable 30 is disconnected from one or both devices.

The docking cable 30 has a computer-side connector 32 that physically and electronically mates with the portable computer 24. The computer-side connector 32 includes an anti-theft locking mechanism that locks onto the portable computer 24. For example, the locking mechanism may employ a Kensington lock or other type of lock.

A station-side connector 34 physically and electronically mates with the docking station 22. The station-side connector 34 may also be equipped with a locking mechanism like computer-side connector 32, or may alternatively be permanently or semi-permanently mounted to the docking station.

The docking cable 30 is a flexible interface and security assembly having electrically-conductive lines (e.g., signal, ground, and power lines) bundled together with a security cable to form one integrated cabling structure. The security cable is a strong strand that is included in the docking cable 30 to thwart efforts to steal the computer.

Figure 2:
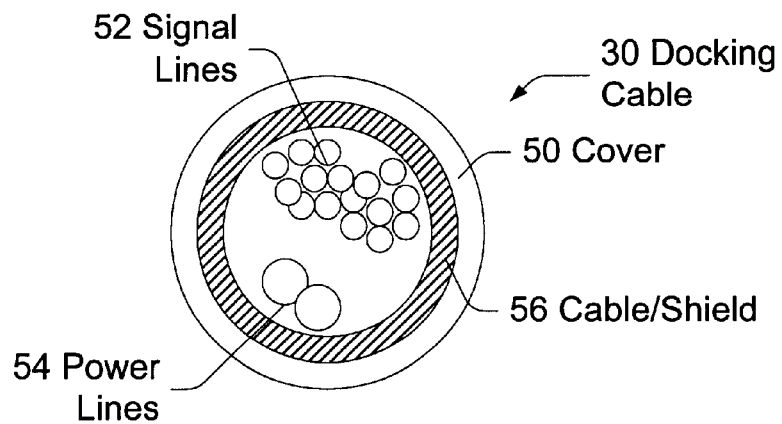
FIG. 2 is a cross-sectional view of a security cable used to interconnect the portable computer and the docking station.

FIG. 2 shows an exemplary construction of the docking cable 30. It includes an outer cover 50 made of plastic or an elastomer material and internal conductive lines, including signal lines 52 and power lines 54. The docking cable 30 also has a security cable 56 constructed of a strong material, such as metal, to provide security against theft. The security cable 56 is constructed of sufficient bulk and strength to defeat or dissuade quick or unobtrusive attempts to cut the cable and steal the computer.

In the illustrated implementation, the security cable 56 is a tubular layer beneath the cover 50 and surrounding the signal lines 52 and power lines 54. The security cable 56 may also be grounded. In this construction, the security cable 56 performs the dual functions as an anti-theft security structure and as an insulation shield to external interference (e.g., electromagnetic interference). It is noted, however, that the security cable 56 may alternatively be implemented as a tether or cord bundled along side the power and signal lines, rather than a tubular structure that wraps the lines, to form the integrated cabling structure.

The docking cable 30 can be formed of sufficient length to wrap around a stationary object (e.g., table leg, chair, wall fixture) to secure the computer 24 and/or docking station 22. As an alternative, the docking cable 30 may have an additional component that allows the cable to be fastened to stationary objects. With reference again to FIG. 1, the docking cable 30 optionally includes an anchor portion 36 to secure the docking cable to a stationary fixture 38 (e.g., deck, wall, table , etc.). The anchor portion 36 has a loop to enable affixat ion to the fixture 38 by a bolt or clamping U-lock 40. The anchor 36 is integrated with, or connected to, the security cable for structural integrity and to ground the security cable 54. The entire computer system 20 is secured when the anchor 36 is securely attached to the fixture 38 and both connectors 32 and 34 are locked onto the portable computer 24 and docking station 22, respectively.

Figure 3:
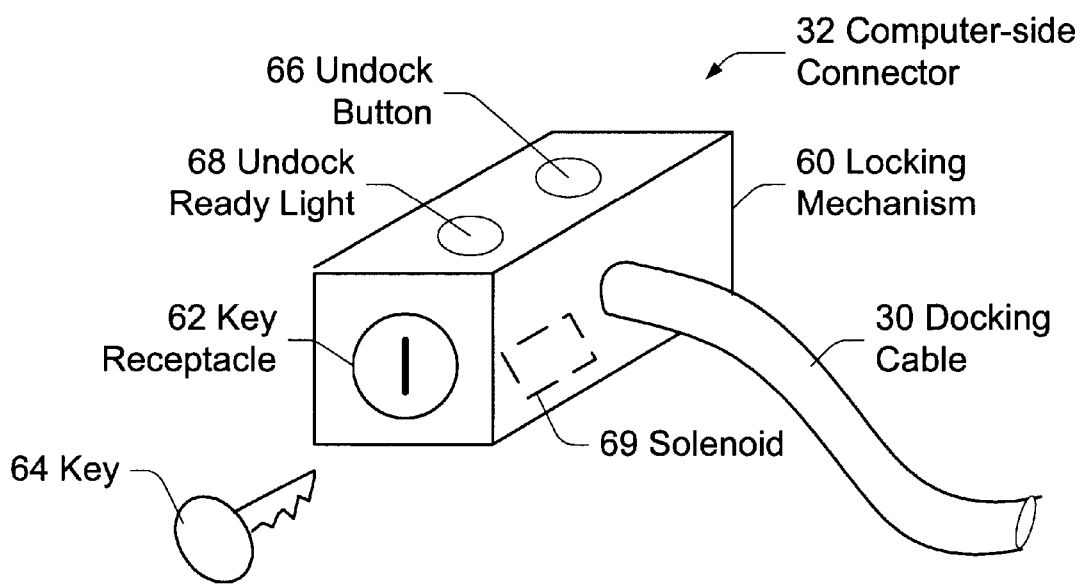
FIG. 3 is a perspective view of a computer-side connector attached to the security cable and used to securely attach to the portable computer.

FIG. 3 shows the computer-side connector 32 in more detail. It has a locking mechanism 60 that includes a key receptacle 62 and compatible key 64 to enable user-actuation of the locking mechanism. The locking mechanism 60 automatically engages and locks the computer 24 when attached. The locking mechanism is disengaged by using the key 64 and/or by a command entered in to the computer by the user. In addition, disengagement of the locking mechanism might involve user-entry of a password so that the computer knows that the person seeking to undock the computer (i.e., the person in physical possession of the key 64) is authorized to do so.

The connector 32 also has an undock button 66 to allow the user to request that the computer be undocked from the docking station. An "undock ready" indicator light 68 is also provided on the connector 32 to inform the user that it is now safe to undock the computer.

Figure 4:
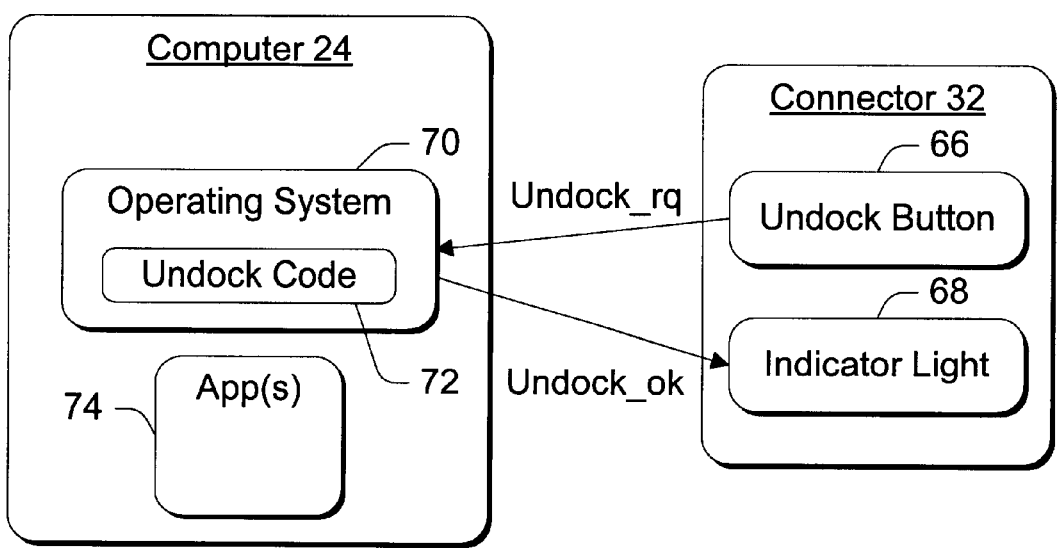
FIG. 4 is a block diagram of functional components in the computer-side connector and the computer.

FIG. 4 shows an exemplary implementation of the interaction between the computer-side connector 32 and the computer 24. When the user depresses the undock button 66, the connector 32 generates and sends a signal (i.e., "undock_ra") to the computer operating system 70 to initiate an undocking procedure 72. The software prepares the computer 24 and any software programs 74 to be decoupled from components or resources made available through the docking station. When the undocking procedure 72 completes execution, the operating system 70 returns a signal (i.e., "undock_ok") activating the indicator light 68 on the connector 32 to inform the user that the computer is ready to be undocked. At that point, the user can use the key 64 to unlock the locking mechanism 60 and disconnect the connect or 32 from the computer 24.

With reference again to FIG. 3, in an alternative embodiment, the locking mechanism 60 is equipped with a solenoid 69 that drives a pin between two positions: (1) a first position that prevents unlocking, and (2) a second position that allows unlocking. The computer 24 sends a signal through an electrical connection to control the solenoid, and thereby selectively control the locking and unlocking of the connector 32.

With this implementation, the undocking procedure 72 may optionally ask the operating system 70 to perform a password challenge as a condition for allowing the undocking request. The password challenge presents a user interface (UI) dialog box on the computer and prompts the user to enter a password. That password is compared with a stored password. If the two match, the computer assumes that the person requesting the undocking procedure is authorized to do so and the undocking procedure sends a signal to actuate the solenoid 69 and unlock the connector 32. The computer also sends an "undock_ok" signal to inform the user when it is okay to remove the docking cable 30.

If the password fails to match the stored password, the computer assumes the person is not authorized to undock the computer. In this case, the computer does not send the signal to actuate the solenoid 69, but instead keeps the connector 32 in its locked state. In addition, the computer does not return the "undock_ok" signal to illuminate the indicator light 68.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A docking cable to interconnect an electronic device with a docking station, comprising:
   at least one electrically conductive line configured to electrically connect the electronic device and the docking station; and
   a security cable bundled together with the electrically conductive line to form an integrated cabling structure; wherein the security cable surrounds the electrically conductive line.

2. A docking cable as recited in claim 1, wherein the at least one electrically conductive line is selected from a group comprising a signal line, a ground line, and a power line.

3. A docking cable as recited in claim 1, further comprising signal and power lines bundled together with the security cable in the integrated cabling structure.

4. A docking cable as recited in claim 1, further comprising:
   a first connector to connect the cabling structure to the computer electronic device; and
   a second connector to connect the cabling structure to the docking station.

5. A docking cable as recited in claim 1, further comprising an anchor portion of cable to connect the cabling structure to a fixture.

6. A docking cable to interconnect an electronic device with a docking station, comprising:
   at least one electrically conductive line configured to electrically connect the electronic device and the docking station; and
   a security cable bundled together with the electrically conductive line to form an integrated cabling structure, wherein the security cable surrounds the electrically conductive line and is grounded to form a shield to protect the electrically conductive line.

7. A docking cable to interconnect an electronic device with a docking station, comprising:
   at least one electrically conductive line configured to electrically connect the electronic device and the docking station;
   a security cable bundled together with the electrically conductive line to form an integrated cabling structure; and
   a locking mechanism to secure the cabling structure to the electronic device.

8. A docking cable to interconnect an electronic device with a docking station, comprising:
   at least one electrically conductive line configured to electrically connect the electronic device and the docking station;
   a security cable bundled together with the electrically conductive line to form an integrated cabling structure; and
   an undocking button to enable a user to request that the electronic device be undocked from the docking station.

9. A docking cable to interconnect an electronic device with a docking station, comprising:
   at least one electrically conductive line configured to electrically connect the electronic device and the docking station;
   a security cable bundled together with the electrically conductive line to form an integrated cabling structure; and
   an indicator light to indicate when it is safe to undock the electronic device from the docking station.

10. A computer system, comprising:
    a docking station;
    a computer; and
    a docking cable to interface the computer with the docking station, the docking cable having:
       at least one electrically conductive line configured to electrically connect the computer and the docking station; and
       a security cable bundled together with the electrically conductive line to form an integrated cabling structure.

11. A docking cable to electrically connect a computer with a docking station, comprising:
    an integrated cabling structure having at least one electrically conductive line bundled together with a security cable;
    a computer-side connector coupled to one end of the integrated cabling structure to alternately connect to and disconnect from the computer, the computer-side connector having a locking mechanism to lock the computer-side connector onto the computer;
    a station-side connector coupled to another end of the integrated cabling structure to interface with the docking station; and
    the integrated cabling structure further having an anchor portion of cable to enable affixation of the integrated cabling structure to a fixture.

12. A docking cable as recited in claim 11, wherein the security cable surrounds the at least one electrically conductive line.

13. A docking cable as recited in claim 11, wherein the computer-side connector has an undocking button that enables a user to request that the computer be undocked from the docking station.

14. A docking cable as recited in claim 11, wherein the computerside connector has an indicator light to indicate when it is safe to undock the computer from the docking station.

15. A docking cable as recited in claim 11, wherein the computer-side connector has a solenoid, actuatable by signals received from the computer, that alternately allows and prevents the locking mechanism to be unlocked.

16. A computer system, comprising:
    a docking station;
    a computer; and
    a docking cable to interface the computer with the docking station, the docking cable having:
       an integrated cabling structure having at least one electrically conductive line bundled together with a security cable;
       a computer-side connector coupled to one end of the integrated cabling structure to alternately connect to and disconnect from the computer, the computer-side connector having a locking mechanism to lock the computer-side connector onto the computer;
       a station-side connector coupled to another end of the integrated cabling structure to interface with the docking station; and
       the integrated cabling structure further having an anchor portion of cable to enable affixation of the integrated cabling structure to a fixture.

17. A computer system, comprising:
    a docking station;

a computer; and a docking cable to interface the computer with the docking station, the docking cable having:
- a locking mechanism that securely fastens to the computer;
- a cabling structure that bundles an electrically conductive line together with a security cable; and
- a cable anchor to affix the cabling structure to a fixture.

18. A computer system as recited in claim 17, wherein the docking cable has an undocking button to enable a user to request that the computer be undocked from the docking station.

19. A computer system as recited in claim 17, wherein the docking cable has an indicator light to indicate when it is safe to undock the computer from the docking station.

* * * * *